(12) United States Patent
Payton

(10) Patent No.: US 7,877,347 B2
(45) Date of Patent: Jan. 25, 2011

(54) METHOD AND SYSTEM FOR INDEPENDENTLY OBSERVING AND MODIFYING THE ACTIVITY OF AN ACTOR PROCESSOR

(76) Inventor: David W. Payton, 22275 Dardonne St., Calabasas, CA (US) 91302-5869

( * ) Notice: Subject to any disclaimer, the term of this patent is extended or adjusted under 35 U.S.C. 154(b) by 755 days.

(21) Appl. No.: 11/800,263

(22) Filed: May 3, 2007

(65) Prior Publication Data

US 2008/0275828 A1 Nov. 6, 2008

(51) Int. Cl.
*G06F 15/00* (2006.01)
*G06F 15/18* (2006.01)

(52) U.S. Cl. .................................................. 706/62
(58) Field of Classification Search ............... 714/55; 706/10, 14, 62
See application file for complete search history.

(56) References Cited

U.S. PATENT DOCUMENTS

| | | | | |
|---|---|---|---|---|
| 4,713,758 | A * | 12/1987 | De Kelaita et al. ............. | 714/32 |
| 5,488,716 | A | 1/1996 | Schneider et al. | |
| 5,708,776 | A * | 1/1998 | Kikinis ......................... | 714/55 |
| 6,363,464 | B1 | 3/2002 | Mangione | |
| 6,393,582 | B1 | 5/2002 | Klecka et al. | |
| 6,910,155 | B2 * | 6/2005 | Ku ............................... | 714/30 |
| 6,918,058 | B2 * | 7/2005 | Miura et al. ................... | 714/30 |
| 7,225,369 | B2 * | 5/2007 | Schumacher et al. .......... | 714/55 |
| 7,260,743 | B2 * | 8/2007 | Fellenstein et al. ............ | 714/26 |
| 7,472,320 | B2 * | 12/2008 | Berndlmaier et al. ....... | 714/724 |
| 7,484,121 | B2 * | 1/2009 | Gangadhar .................... | 714/26 |
| 2004/0153886 | A1 * | 8/2004 | Schumacher et al. .......... | 714/55 |
| 2004/0193884 | A1 * | 9/2004 | Molaro et al. ................ | 713/175 |
| 2006/0150016 | A1 * | 7/2006 | Miller et al. .................. | 714/25 |
| 2006/0242517 | A1 * | 10/2006 | Pedley et al. ................. | 714/731 |
| 2007/0294601 | A1 * | 12/2007 | Chitsaz et al. ................ | 714/55 |
| 2008/0126852 | A1 * | 5/2008 | Brandyberry et al. .......... | 714/8 |
| 2008/0263409 | A1 * | 10/2008 | Miller et al. .................. | 714/45 |

OTHER PUBLICATIONS

Kephart, Jeffery O. and Chess, David M.,"The Vision of Autonomic Computing", Computer magazine, IEEE Jan. 2003 pp. 41-50.*
Benso, A.; Di Carlo, S.; Di Natale, G.; Prinetto, P. "A Watchdog Processor to Detect Data and Control Flow Errors", On-Line Testing Symposium, IOLTS 2003, Jul. 7-9, 2003 pp. 144-148.*
Harish Patil and Charles Fischer "Efficient Run-time Monitoring Using Shadow Processing," presented at AADEBUG'95.

* cited by examiner

*Primary Examiner*—Michael B. Holmes
*Assistant Examiner*—Vincent M Gonzales
(74) *Attorney, Agent, or Firm*—Tope-McKay & Assoc.

(57) ABSTRACT

A system, method, and computer program product for observing and modifying activity in an actor processor are presented. An observer module is provided for observing a physical property of an actor processor. The observer module comprises a property-observing sensor for detecting and sampling a physical property of the actor processor and for generating an observation signal based on the physical property. The observer module further comprises an observer processor coupled with the property-observing sensor for receiving the observation signal, the observer processor operative to generate an observer output signal based on the observation signal. The observer module permits the observer processor to monitor the actor processor in a manner that isolates an instruction set of the observer processor from direct manipulation by means of an instruction set of the actor processor. Observer processors may be used in a recursive manner to provide a completely-coupled observation module.

34 Claims, 8 Drawing Sheets

METHOD AND SYSTEM FOR INDEPENDENTLY OBSERVING AND MODIFYING THE ACTIVITY OF AN ACTOR PROCESSOR

BACKGROUND OF THE INVENTION (1) Field of the Invention

The present invention relates to a self-aware computing system. More specifically, the present invention relates to a computing system that allows for levels of self-monitoring and behavior modification by incorporating observer processors which operate independently of actor processors that carry out system operations.

(2) Description of Related Art

Self-awareness generally refers to an ability to reason about one's own actions and thoughts. An important part of this concept is an ability to reflect upon one's own actions and consider the consequences of those actions before they occur. More fundamentally, however, self-awareness is generally considered an ability to mentally stand outside oneself and reason as an observer or on-looker peering into the mind of another. In its simplest form, having the ability for a computer to detect when it is in an undesirable operating state would constitute at least some modicum of self-aware computing that is rarely seen. Despite impressive advantages in computing technology over the last few decades, generating self-awareness in machines remains an unresolved problem.

One of the primary difficulties in generating "true" self-awareness lies in the fact that there are limitations to generating awareness using a single processing device. As an example, two processes, an actor process and an observer process, cannot run on the same hardware without tending to interfere with one another. This is because the very act of making an observation changes the state of the system being observed, this claim applying to software in a case where the software attempts to observe hardware states of the machine upon which it runs. Consider, for example, two programs running on the same hardware. Suppose that one of the two programs, an observer process, is designed to monitor the hard disk access patterns of the other. To do this, the first program occasionally uses computing resources itself, including the hard disk. Thus, in the course of switching between programs, the computer hardware may ultimately exhibit disk access patterns that are different from those that would be observed with one program running alone. In effect, the observer process has no way to distinguish between patterns that are independent of it and those that are an artifact of its own activity.

On the other hand, if an actor process and an observer process running on the same hardware might interfere with each other, one may consider that simulating two independent machines on a single computer may accomplish the desired level of self-awareness. If possible, this could be attained by running multiple virtual machines on the same processor. However, there are theoretical and practical considerations that make it doubtful that such a configuration would possess properties that would prevent the actions of the observer from altering its own observations. On the theoretical side, there is the issue of clock synchrony. It is known in the art that any simulation of coupled virtual machines running on the same processor must share the same reference clock. Their simulated clocks may run at different rates, but it is impossible for the ratio of frequencies to be anything other than a rational number. In contrast, it is known that for coupled parallel machines with independent clocks, the ratio of clock frequencies will invariably be an irrational number. The physical machines may therefore, in theory, produce results that cannot be generated by application of concurrent machine simulations on the same physical hardware.

Whether or not the above theoretical issue could lead to significant qualitative differences in behavior between concurrent virtual machines and concurrent physical machines remains to be seen. Nevertheless, there are practical considerations that remain. First, each virtual machine is typically a very abstract version of a physical machine. It has no disk drives, no adder circuits, no input/output buffers, etc. This means that ultimately there is no access to the underlying semantics of the machine itself. Of course, a machine could always be simulated all the way down to the individual gates, logic circuits, and disk drives. However, any attempt to do so would still leave behind some of the semantics of the machine. Even if one argues that there is a limit on how far one may need to go, it is clear that approaching this limit is highly impractical. As a machine tries to simulate itself to greater and greater degrees of precision, the fewer resources it has available to do anything else, and all interactivity will be lost.

There are many instances of multiple processor systems that provide a degree of self-monitoring (in many cases, limited to a form of operational redundancy), such as those used in mission-critical systems, with typical configurations including two or more processors, each running the same software and linked together in a voting scheme. Some mission-critical systems incorporate an active processor and a shadow processor which runs parallel to the actor in order to help to detect runtime errors. There are several different versions of this approach. In one version, the shadow processor runs the same instructions as the active processor so that the shadow processor may be switched in when a failure occurs in the active processor or so that the active processor can be restarted. In another version, the shadow processor runs a variant of the program running on the active processor. This version may be used to track pointer and memory allocation to detect run-time errors in the main program. In yet another version, code branches are speculatively executed to assist in pre-fetching data for the active processor's cache. Typically, where shadow processors and active processors communicate, they do so through a common memory mechanism.

In methods of monitoring utilizing shadow-processors, the shadow processor generally emulates the activities of the active processor in some way. This means that that shadow processor is still bound to the confines of the same inputs and outputs as the active processor. Thus, while the shadow processor may be able to detect certain run-time errors in the code of the active processor, it still cannot easily detect anomalous behavior of the active processor that might result from unexpected inputs. A good example of this is a network switch. The code on the switch might be free of pointer overflow or memory allocation errors, yet when the switch is subject to certain network traffic, it may behave badly. Adjusting a parameter in the code may solve this problem, but the code itself has no way of reflecting upon its own behavior, regardless of whether the code is running on the active processor or the shadow processor—not, at least, without slowing down its own performance, thereby altering the processor's behavior in an undesirable way.

In light of the current state of the art, there exists a need for a reliable self-aware computing system that includes an observer processor that operates independent of an actor processor. Such a system would allow the observer processor to monitor the actor processor without altering the actor processor in any way until a need arises. Such a system would also isolate the observer processor from the actor processor such that instructions running on the actor processor cannot be used to directly control the observer processor.

SUMMARY OF THE INVENTION

The present invention is a method and system for independently observing and modifying activity in an actor processor. The actor processor includes a memory, an input for receiving actor input information, an actor software state, and an actor hardware state. The system comprising an observer module including a property-observing sensor for detecting and sampling a physical property of the actor processor and for generating an observation signal based on the physical property. The observer module also includes an observer processor coupled with the property-observing sensor for receiving the observation signal. The observer processor is operative to generate an observer output signal based on the observation signal.

In another aspect, the actor processor has an actor instruction set and the observer processor has an observer instruction set. The actor instruction set is mapped to the physical property such that the mapping eliminates the ability of the actor instruction set to affect the observer instruction set.

Additionally, the actor processor has a clock with a clock frequency and the physical property is sampled by the property-observing sensor at a sampling rate by the property-observing sensor. Furthermore, the sampling rate is not synchronized with the clock frequency of the clock of the actor processor.

In yet another aspect, the observer processor has a clock. The clock of the observer processor and the clock of the actor processor are independent and decoupled such that they operate asynchronously.

Additionally, the physical property observed by the property-observing sensor is outside of the explicit control of the instruction set of the actor processor. The property-observing sensor obtains information about the state of the actor processor in an aggregate form. Furthermore, the property-observing sensor provides isolation between the actor processor and the observer processor such that integrity of the instruction set of the observer processor is shielded from explicit alteration by the actor processor.

The present invention further comprises a plurality of consecutive observer modules in a recursive relationship, where each consecutive observer module is configured to observe a previous observer module, treating the previous observer processor as an actor processor.

Additionally, an observer module comprises a plurality of property-observing sensors, wherein an observer processor is configured to be coupled with a plurality of property-observing sensors. Each observer processor is observed by at least one other observer processor, thereby creating a completely observer-coupled recursive system.

The observer module further includes a communication link connected with a control module, and operative to transmit a signal from the observer processor to the control module to trigger a system action upon the detection of a predetermined observation signal. The communication link is a unidirectional communication link.

The system action is selected from a group consisting of an alarm; accessing a logical port of the actor processor; a change in the actor software state; a change in the actor hardware state; a change in the actor processor input; a deployment of a counter measure; a triggering of additional sensors based on the observation signal to more specifically monitor the actor processor (where the additional sensors are connected with an observer processor for providing supplementary information to the observer processor, to be used in combination with the observation signal for generating an enhanced observation signal); pausing the actor processor and granting diagnostic and corrective access to the information content of the actor processor; and triggering a system-external action.

Additionally, the change in the actor software state is selected from a group consisting of a software-level reset; initiation of a software interrupt routine; an adaptive processing change; and an adaptive bandwidth allocation change.

Furthermore, the change in the actor hardware state is selected from a group consisting of switching out the memory of the actor processor; an adaptive bandwidth allocation change; a hardware data source switching change; an adaptive processing change at the actor; an adaptive processing shift between actors; cycling a power supply to the actor processor; an imposition of a hardware interrupt and imposition of an interrupt routine on the actor processor; and a change in connections between the actor processor and external networks and devices.

Additionally, the change in the actor processor input is selected from a group consisting of a switching operation to restrict access to a data source and a switching operation to change data sources.

The system-external action is selected from a group consisting of triggering a closed-circuit video monitoring system observing an area; a locking of a physical barrier; and a deployment of a hazard reduction system.

The property-observing sensor is selected from a group consisting of an electromagnetic pickup device for receiving electromagnetic signals from the processor; an electromagnetic imaging device; a voltage-sensing tap coupled with actor processor circuitry; a current-sensing tap coupled with actor processor circuitry; a mechanical vibration sensor; and an array of thermal sensors.

The electromagnetic pickup device comprises an antenna for receiving electromagnetic signals from the processor and an analog-to-digital (AD) converter for converting the electromagnetic signals to digital signals for use by the observer processor. The electromagnetic pickup device further comprises a frequency down-converter to down-convert a high frequency electromagnetic signal from the actor processor into a lower frequency signal prior to sampling. The down-converter is an AM/FM tuner tuned near a harmonic of a clock frequency of the actor processor.

The present invention further comprises a secondary property-observing sensor connected to provide a signal to the observer processor for use as an observation signal. The secondary property-observing sensor is selected from a group consisting of temperature sensors; magnetic field sensors; electricity meters; humidity sensors; motion sensors; pressure sensors; and air quality sensors.

In another aspect, the observer processor includes a classifier trained to classify observation signals and to generate an observer output signal based on the classification.

In yet another aspect, the present invention further comprises an information-observing sensor configured for receiving the actor information and for passing the information to the observer processor.

In another aspect, the classifier is trained to classify combinations of the observer signals and actor information and to generate an observer output signal based on the classification.

In yet another aspect, at least a portion of the observer processors are directly interconnected to exchange information, thus providing a network of observer processors.

Additionally, the observation signal is a digital signal. The observer processor analyzes the observation signal by a technique selected from a group consisting of: spectral analysis; filtration of frequency components; wavelet analysis; time-frequency analysis; and extraction of at least one pattern of frequency component combinations. At least one pattern of frequency component combinations is a predetermined pattern of frequency component combinations indicating undesirable actor processor behavior.

Additionally, the observer processor and the property-observing sensor, and the secondary property-observing sensor are integrated as a single component.

Furthermore, the actor processor is configured with an operating system routine that evokes a known pattern in the physical property. The observer processor is configured such that the observer processor may detect the pattern whenever the operating system routine is run on the actor processor.

The present invention further comprises a plurality of interconnected observer modules, wherein an observer module comprises a plurality of property-observing sensors. An observer processor is configured to be coupled with a plurality of the property-observing sensors. Each observer processor is observed by at least one other observer processor, thereby creating a completely observer-coupled system.

In another aspect, the present invention further comprises an information-observing sensor configured for receiving the actor information and for passing the information to the observer processor for use in conjunction with the observation signal for generating the observer output signal. At least a portion of the observer processors are directly interconnected to exchange information, thus providing a network of observer processors.

In yet another aspect, the present invention comprises a method for independently observing and modifying activity in an actor processor. The method comprises acts according to the operations described herein.

Finally, the present invention also includes a computer program product. The computer program product comprises computer readable code that is executable by a computer for causing the computer to perform the operations described herein.

BRIEF DESCRIPTION OF THE DRAWINGS

The objects, features and advantages of the present invention will be apparent from the following detailed descriptions of the preferred aspect of the invention in conjunction with reference to the following drawings, where.

DETAILED DESCRIPTION OF PREFERRED ASPECTS

Figure 1:
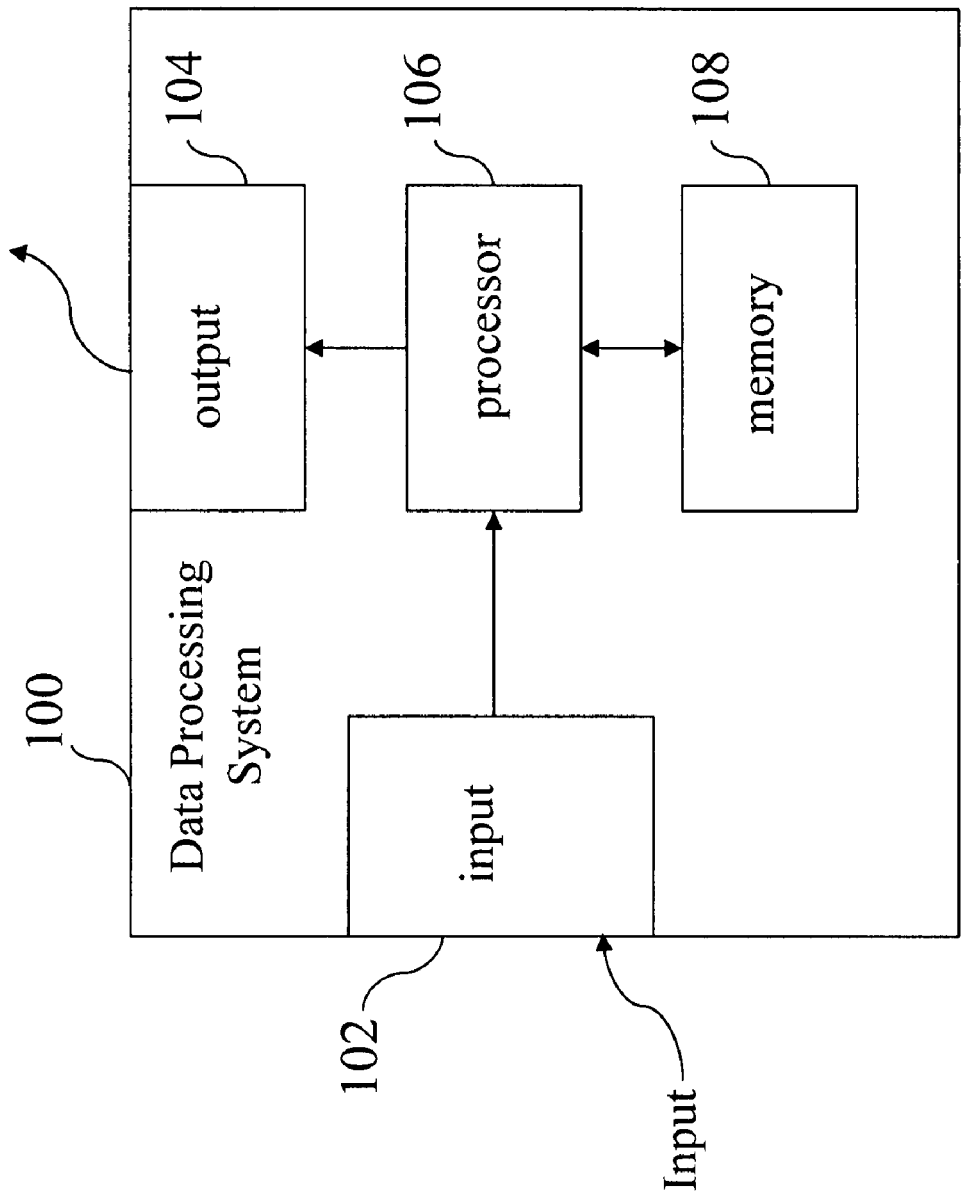
FIG. 1 is a block diagram of a data processing system for use with the present invention.

The present invention relates to a self-aware computing system. More specifically, the present invention relates to a computing system that allows for levels of self-monitoring and behavior modification by incorporating observer processors which operate independently of actor processors that carry out system operations. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to clearly explain the present invention, a glossary of terms is presented immediately below to provide the reader with a general understanding of certain terms used in this description. Next, the principal aspects of the invention are presented, explaining some of the general manifestations of the invention. Following the discussion of the principal aspects, an introduction is presented in which the general concept of the invention and its derivation are discussed. Finally, specific details of the invention are provided in which various specific aspects of the invention are discussed.

(1) Glossary

Below, a brief glossary of terms is presented for the reader. These definitions are not intended to convey the full scope of the terms in respect to the invention, but are provided to give the reader a general understanding of the terms and to serve as a central location to which the reader can refer. It is intended that the reader use the information in the remainder of the description to supplement the description of the terms below in order to gain a better understanding of their full meaning.

Actor Hardware State—Generally defined, the actor hardware state is an aggregate of an instantaneous state of all of the physical components of an actor processor.

Actor Input Information—Actor input information is generally defined as any data input to an actor processor. Such input may be received from sources such as a computer network, from peripherals, or from data storage sources such as floppy disks and optical discs.

Actor Instruction Set—An actor instruction set is a combination of the hardware instruction set embedded in the actor processor and operating system commands accessible to a user.

Actor Processor—An actor processor is defined as any processing system that is monitored by an observer processor. The actor processor may also be a processor used as an observer processor.

Actor Software State—An actor software state is an aggregate state of the software operating in the actor processor.

Classifier—A classifier is broadly defined as any decision-making system. Such systems range from simple Boolean logic decision systems to more complex structures such as neural networks. Any appropriate classifier may be used in conjunction with the present invention.

Connections—Connections in the context of the present invention include any mechanism for transferring data from one point to another. For example, processors and sensors may be connected by wired or wireless means.

Control Module—A control module is a mechanism for affecting an actor processor based on a particular measured physical property of the actor processor. The control module may, for example, be used to trigger an interrupt routine on the actor processor. The control module may also be used to trigger alarms or take other external actions. As with other components, the control module may be in hardware or software form and may be internal or external to an observer module.

Information-observing Sensor—An information observing sensor is a sensor that, rather than observing a physical property of an actor processor, samples the input and/or output of an actor processor. Such a sensor may be used to aid in correlating patterns in a physical property with particular actor processor inputs and/or outputs.

Observation Signal—An observation signal is a signal from a property-observing sensor representing some physical property observed. The property-observing sensor observes the physical property and generates the observation signal for provision to an observer processor.

Observer Instruction Set—An observer instruction set is a combination of the hardware instruction set embedded in the observer processor and operating system commands accessible to a user.

Observer Output Signal—An observer output signal is an output of the observer processor. The observer output signal may, for example, be the output of a classifier providing classification information related to a particular pattern occurring in a physical property of the actor processor.

Observer Processor—An observer processor is defined as any processing system that monitors an actor processor. The observer processor may also be monitored by another observer processor, thus serving as an actor processor.

Physical Property—A physical property is any property of an actor processor observed by an observer processor, representing an aggregate effect of a set of operations on an actor processor. Non-limiting examples of physical properties include the frequency and amplitude of electromagnetic radiation from the processor, changes in the power drawn by the processor, and heat radiated from the processor.

Property-observing Sensor—A property-observing sensor is a sensor used by an observer processor to gather data regarding a physical property of an actor processor.

Secondary Property-observing Sensor—A secondary property-observing sensor is a sensor that may be used to gather data regarding a physical property of an actor processor. Additionally, a secondary property-observing sensor may be used to gather data outside the influence of the actor processor, non-limiting examples of which include ambient humidity and temperature as well as extraneous magnetic fields.

System Action—A system action is a general label for an action triggered as a result of an observer processor's detection of a particular pattern in an actor processor.

Next, a discussion of various principal aspects of the present invention is provided. Subsequently, an introduction is provided to generate a context for the present invention. Finally, specific details are provided to give a reader a detailed understanding of the present invention.

(2) Principal Aspects

The present invention has several "principal" aspects, three of which are emphasized in this section. The first is an observer module system for independently observing and modifying the activity of an actor processor. The system typically comprises both hardware and software components, but may also be in the form of a computer system operating software or in the form of a "hard-coded" instruction set for use with computer system. This system may be incorporated into various devices and may be coupled with a variety of sensors to provide for observing various characteristics of the actor processor. The second principal aspect is a method, operated using a data processing system (computer). The third principal aspect is a computer program product for operating the computer system. The computer program product generally represents computer readable code stored on a computer readable medium that is executable by a computer system, such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below and in the remainder of the specification.

A block diagram depicting the components of a computer system that may be used in conjunction with the present invention is provided in FIG. 1. Note that this generic data processing system 100 may represent either an actor processor or an observer processor. The data processing system 100 comprises an input 102 for receiving information from at least one information source. In the case of an actor processor, the information source is typically a source of data to be processed in the ordinary course of its computing activities. In the case of an observer processor, the information source may be a sensor configured to provide data regarding some aspect of the actor processor, and it may also be a copy of input data provided to the actor processor. Note that for both the case of an actor processor and an observer processor, the input 102 may include multiple "ports." An output 104 is connected with a processor 106 for providing information to other systems or to users. The input 102 and output 104 may be in the form of networking devices, permitting actor processors to communicate with other actor processors and observer processors to communicate with other observer processors. Output may also be provided to other devices or other programs, e.g. to other software modules for use therein or to display devices for display thereon. The input 102 and the output 104 are both coupled with the processor 106, which may be a general-purpose computer processor or a specialized processor designed specifically for use with the present invention (e.g., an actor processor may be specifically designed to cause particular observable phenomena to occur with the operation of a particular routine and an observer processor may be specifically designed to ensure its integrity is not at risk with a particular type of actor processor). The processor 106 is coupled with a memory 108 to permit storage of data and software during operation.

Figure 2:
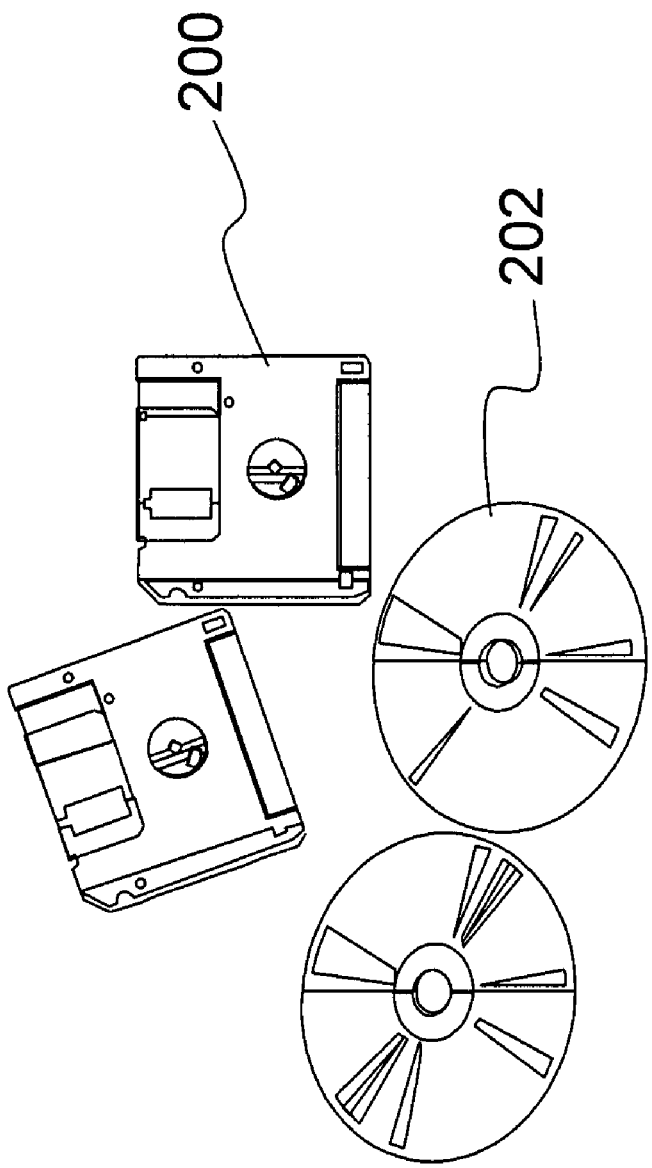
FIG. 2 is an illustrative diagram of a computer program product according to the present invention.

An illustrative diagram of a computer program product embodying computer executable instructions according to the present invention is depicted in FIG. 2. The computer program product is depicted as a magnetic disk 200 or an optical disk 202 such as a CD or DVD. However, as mentioned previously, the computer program product generally represents computer readable code stored on any desirable computer readable medium that is executable by a computer to cause the computer to perform various operations.

(3) Introduction

In a general sense, a self-monitoring computing scheme may be used to make any computing system more robust and more self-aware. As machines become more interactive with users and their environment, this inherent lack of self-awareness becomes increasingly apparent. Some simple examples from everyday computer use illustrate just how minor amounts of self-awareness might greatly enhance system performance. In one instance, self-awareness may help to detect and to cure a problem of a graphical, mouse-controlled, pointer freezing or jumping erratically as a user moves the mouse. In this situation, the question is, "how can the machine detect and correct this problem?" Self-awareness may further aid in recognizing and avoiding situations where a web server becomes bogged down with network activity from a denial of a service attack and eventually halts. The question here becomes, "how can the machine recognize this state and how can it avoid it in the future?" In another situation, a database program begins executing a query but then finds the transaction log to be too full for its next operation. In this case, the questions are "why should the program have to sit idle until an administrator comes to dump the log?" and "why doesn't the idleness of the machine automatically signal a problem?" In yet another situation, a hacker attacks a networked machine and modifies its kernel. The attacked machine now performs unusual tasks, but the intrusion detection software is blinded by the kernel modifications. The question here is "how can this anomalous behavior be detected?" Other uses that could greatly benefit from increased self-awareness include use in web-servers which could utilize such self-monitoring to better detect improper system states or even counter denial of service attacks. Upon such detection, a system could automatically alter its hardware parameters or reboot rather than require manual intervention by a human operator. Such self-aware schemes can also be used with embedded processors used to control future satellites or fly-by-wire automotive control systems. In these systems, detection of anomalous or unusual behavior may be an initial indicator of a systemic problem, and might allow safer or more reliable intervention before the problem becomes a catastrophic failure. Other applications might include network intrusion detection systems, where it is desirable to completely isolate an intrusion detection network that reasons about possible intrusions from a data network that may be the target of an intrusion.

The present invention provides a unique architecture that offers a means to address numerous everyday computing problems without sacrificing real-time interactivity. Notably, to realize such a system with enhanced potential for self-monitoring and self-awareness, there must be a violation of orthogonality between software and hardware states that exists in current computing architecture. There are two novel aspects of the present invention that make this possible. First, an exclusive use of symbolic models of self is disregarded, and in its place the present invention directly senses self. This is accomplished by enabling one processor, an observer processor, to monitor physical properties of another processor, an actor processor, as the actor processor runs. These physical properties, such as electromagnetic emissions, provide an aggregation of hardware and software states that, over time, can reveal patterns and relationships that are otherwise inaccessible to the actor processor on its own. In this case, useful information can be inferred about the actor without ever having to interrupt its real-time operation. Second, the present invention allows the observer processor to have an opportunity to directly alter the hardware states of the actor processor, not just the software states. For example, an observer processor can reset an actor processor, trigger an interrupt routine, or dynamically alter aspects of the actor processor's hardware configuration. However, there is no need for any explicit information exchange and no use of, or contention for, shared resources unless the need to interrupt the active processor arises.

Rather than having a machine model itself, the present invention configures a machine capable of directly sensing itself. Thus, the present invention offers the opportunity to achieve a degree of self-awareness in a computing system while avoiding the infinite regress of self-description. To do this, the present invention embraces the concept of using the world as its own best model and goes one step further by recognizing that the machine is its own best model of itself. Therefore, the present invention allows machines to use physical measurements of themselves in lieu of syntactic models of self-description. This, coupled with suitable methods for learning and anomaly detection, leads to a new class of self-aware cognitive systems.

Next, in the Specific Details section, further details of the system of the present invention are provided as well as a discussion regarding networking applications of sets of observer processors.

(4) Specific Details

The basic component of the present invention is an observer module configured for monitoring the behavior of an actor processor. In the sub-section immediately below, various aspects of observer modules will be presented. After the discussion on observer modules, another sub-section is presented discussing the use of networks of the observer modules.

(a) Observer Modules

Figure 3:
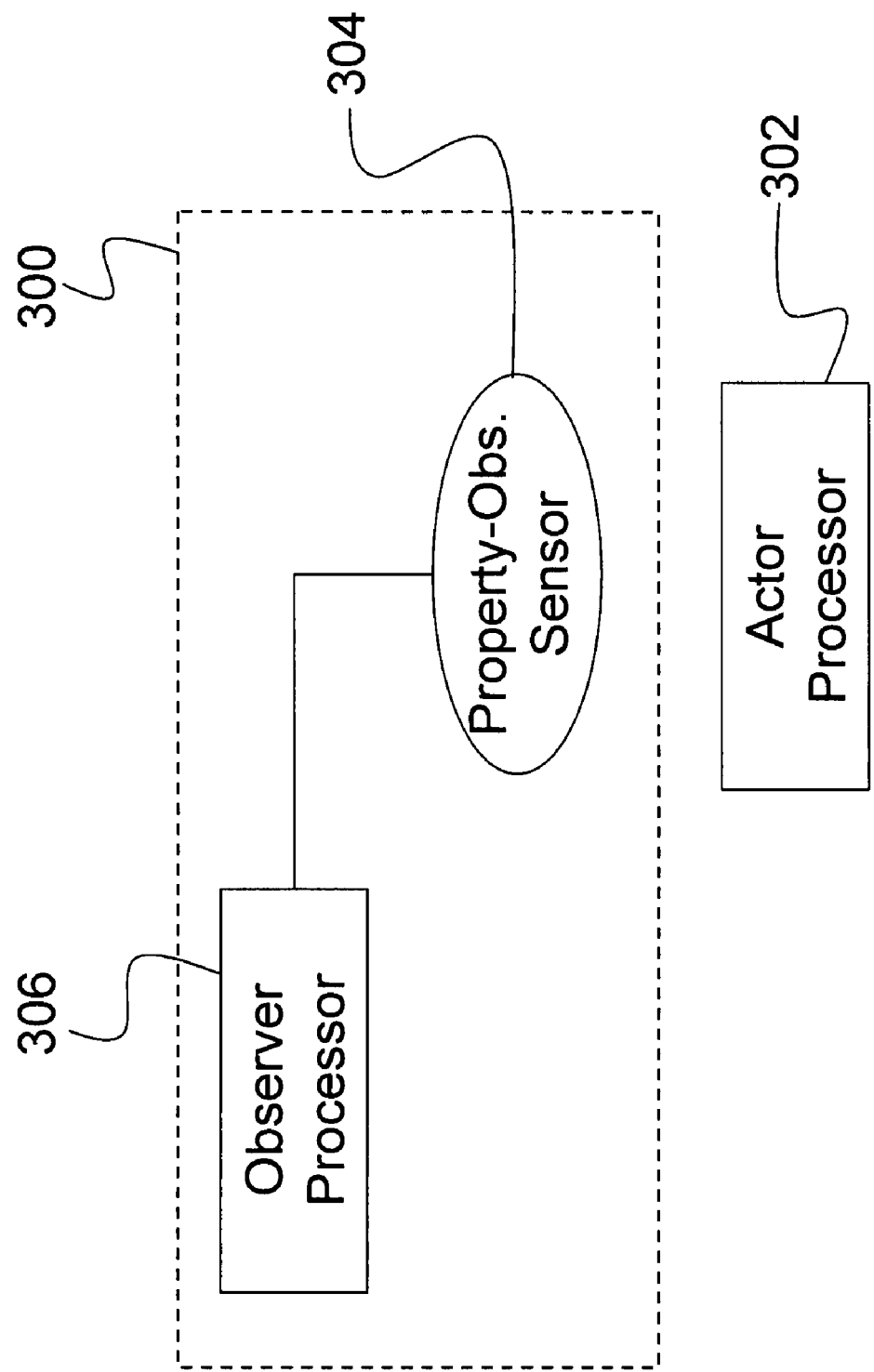
FIG. 3 is a block diagram of a basic observer module according to the present invention.

FIG. 3 presents a schematic diagram of the system of the present invention. As shown, an observer module 300 for monitoring an actor processor 302 is provided. The actor processor 302, in one aspect, is part of a situated agent and has access to dynamic inputs for receiving actor input information as well as outputs. The inputs and outputs of the actor processor 302 allow it to interact with the world. At any given time, the actor processor 302 has an actor hardware state and an actor software state. The observer module 300, in one aspect, comprises a property-observing sensor 304 connected with an observer processor 306. The property-observing sensor 304 samples a physical property of the actor processor 302 and generates an observation signal based on the physical property. The observation signal is transmitted to the observer processor 306, and the observer processor 306 is configured to provide an output based on the observation signal. The output may be generated by including a classifier (such as a neural network or other learning algorithm) in the observer processor, where the classifier is trained to classify observation signals and to generate the observer output signal based on the classification. In some cases, it may be known in advance which particular patterns are indicative of undesirable actor behavior. In such circumstances, a set of conditions or rules may be established in advance. In some cases, specific patterns of undesirable behavior may not be known in advance. In such circumstances, methods for anomaly detection may be applied, where anomaly detection algorithms can provide the means to distinguish regular activity from more unusual activity.

Generally, the physical property observed by the property-observing sensor 304 contains information about the state of the actor processor 302 in aggregate form. In other words, the physical property is some manifestation that reflects the aggregate status of at least a portion of the actor processor 302. The actor processor 302 has an actor instruction set and the observer processor 306 has an observer instruction set. The mapping from the actor instruction set to the physical property does not allow the actor instruction set to affect the observer instruction set. Furthermore, physical properties such as those observed by the property-observing sensor 304 are desirably chosen as those that are outside the explicit control of the instruction set of the actor processor 302 (e.g., the electromagnetic radiation emitted by a processor is generally not a physical property that may be controlled explicitly by commands in the processor's instruction set). The aggregate nature of the physical property, particularly when it is not explicitly controllable through the instruction set of the actor processor, permits the property-observing sensor 304 to provide isolation between the actor processor 302 and the observer processor 306 such that the integrity of the of the observer instruction set is shielded from explicit alteration by the actor processor 302.

Non-limiting examples of physical properties that may be sampled include electromagnetic emissions (such as radio-frequency processor emissions, magnetic emissions, and infrared emissions), power usage, mechanical vibrations, conductive/convective thermal output, voltage use, and current use of the actor processor 302. Non-limiting examples of corresponding property-observing sensors 304 include electromagnetic pickup devices for receiving electromagnetic signals from the actor processor 302, an electromagnetic imaging device, a voltage-sensing tap coupled with the actor processor 302 circuitry, a current-sensing tap coupled with the actor processor 302 circuitry, a mechanical vibration sensor, and an array of thermal sensors.

Figure 4:
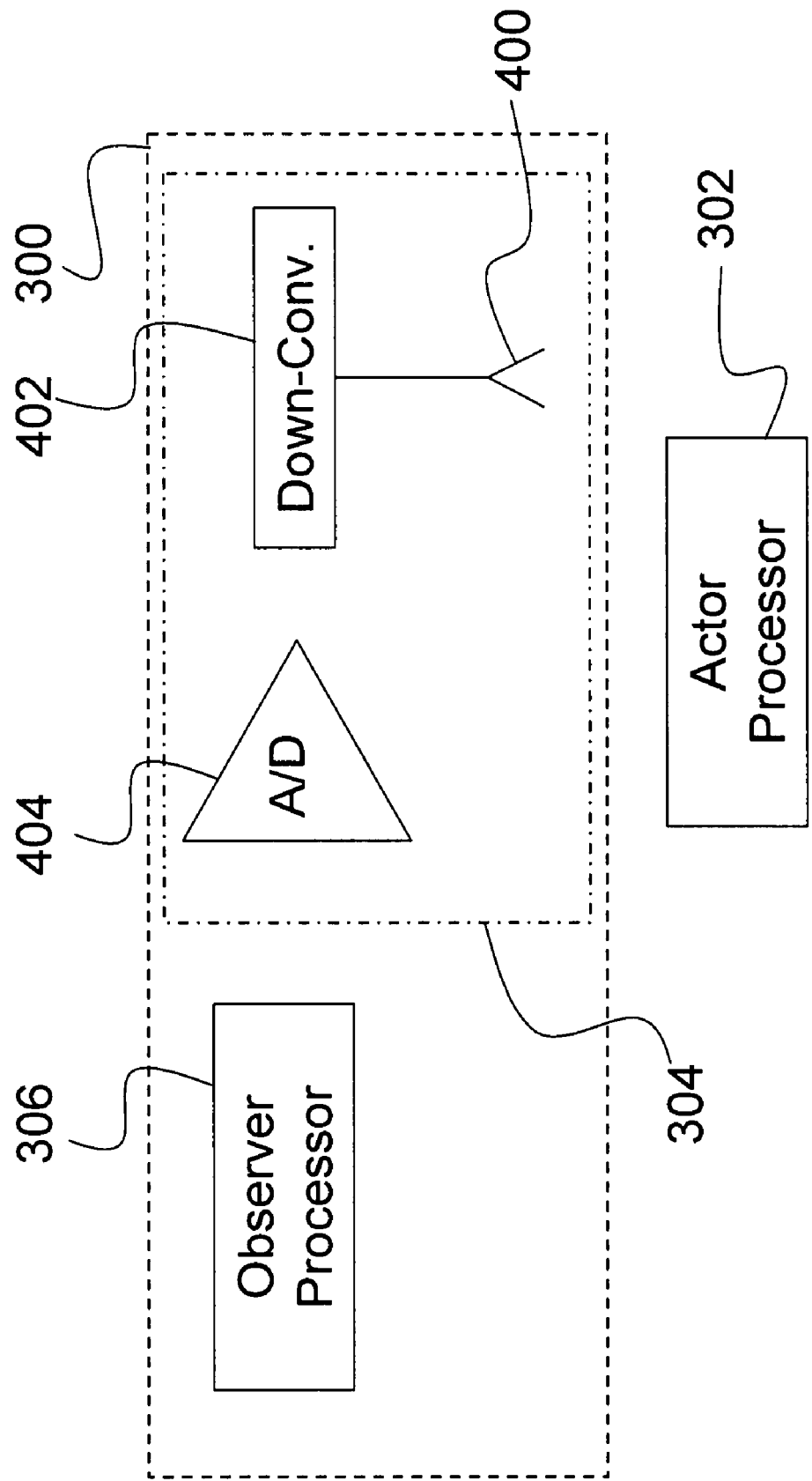
FIG. 4 is a block diagram of an observer module according to the present invention, where a property-observing sensor is shown comprising an analog-to-digital converter, a down-converter, and an antenna.

An example of an electromagnetic pickup device used as a property-observing sensor 304 is depicted in FIG. 4. In this example, the property-observing sensor 304 includes an antenna 400 for receiving an electromagnetic signal from the actor processor 302, a frequency down-converter 402 for converting the electromagnetic signal from a high frequency signal to a lower frequency signal prior to sampling. The property-observing sensor 304 also includes an analog-to-digital (AD) converter 404 for receiving the lower frequency signal from the frequency down-converter 402 and sampling the signal to generate a digital signal. The digital signal is then passed to the observer processor 306 for further processing and/or analysis. The frequency down-converter may, in non-limiting examples, be an amplitude modulation (AM) tuner or a frequency modulation (FM) tuner. The frequency down-converter may be tuned near a harmonic of the actor processor's 302 internal clock frequency.

In the case where the property-observing sensor 304 is an electromagnetic imaging device, non-limiting examples include both passive and active imaging devices. An example of a passive imaging device is an infrared imaging device that receives infrared signals from the actor processor 302 and generates an image that depicts the distribution of heat about the actor processor 302. An example of an active imaging device is an x-ray camera that projects x-rays onto the active processor 302 and receives a return signal from which an image is generated, yielding information about the state of the actor processor 302.

Other measures may be taken to ensure isolation between the actor processor 302 from the observer processor 306. In another aspect, the actor processor 302 has a clock with a clock frequency. The physical property is sampled by the property-observing sensor 304 at a sampling rate and the sampling rate is asynchronous with respect to the clock frequency of the clock of the actor processor 302. In yet another aspect, the observer processor 306 has a clock and the clock of the observer processor 306 and the clock of the actor processor 302 are independent and decoupled so that they operate asynchronously. This effectively removes the possibility of instructions running on the actor processor 302 having a deterministic influence over the observer processor 306.

Figure 5:
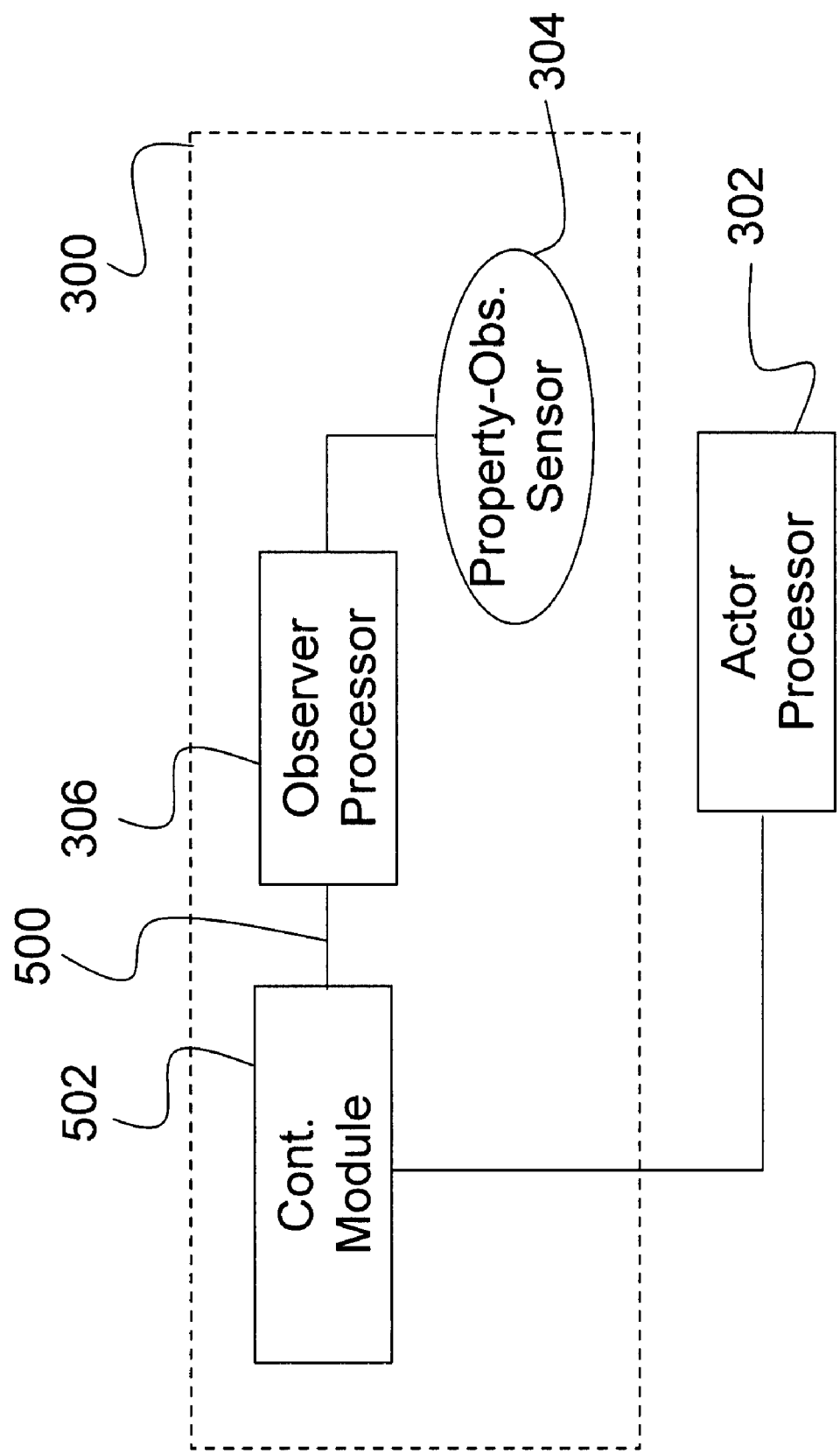
FIG. 5 is a block diagram of an observer module according to the present invention, where the observer module includes a control module for affecting an actor processor.

As shown in FIG. 5, in another aspect, the observer module 300 further includes a communication link 500 connecting the observer processor 306 with a control module 502. The control module 502 is also connected with the actor processor 302. The connection between the control module 502 and the actor processor 302 may be unidirectional to further ensure that the actor processor 302 cannot directly impact the control module 502. When the observer processor 306 receives and detects a predetermined observation signal, it is operative to transmit a signal from the observer processor 306 to the control module 502 to trigger a system action. In some cases, such as where the system action does not directly involve the actor processor 302, the control module 502 may not be connected with the actor processor 302.

Generally, a system action is an action taken as a result of the detection of a particular physical property exhibited by the actor processor 302. The system action may be an action that directly or indirectly affects that actor processor 302, or it may be independent of the actor processor 302. Non-limiting examples of system actions include triggering an alarm, accessing a special logical port of the actor processor 302 to enable attempts to restore the actor processor 302 to normal operation, changing the actor processor 302 software state, changing the actor processor 302 hardware state, changing an input to the actor processor, deploying a counter measure (such as an anti-intrusion routine), triggering additional sensors based on the observation signal to more specifically monitor the actor processor 302, pausing the actor processor 302 and granting diagnostic and corrective access to the information content of the actor processor 302, and triggering a system-external action.

In the case of triggering additional sensors, the additional sensors are connected with an observer processor 306 for providing supplementary information to the observer processor 306 to be used in combination with the observation signal for generating an enhanced observation signal. The enhanced observation signal is generally intended to provide a greater amount of information regarding the actor processor 302 (e.g., if the property-observing sensor 304 is an electromagnetic sensor, an additional sensor in the form of a temperature-measuring array may be triggered to provide further information regarding the actor processor 302).

When the system action is a change in the software state, non-limiting examples of the change include performing a software-level reset on the actor processor 302, initiating a software interrupt routine on the actor processor 302, performing an adaptive processing change on the actor processor 302, and performing an adaptive bandwidth allocation change either on the actor processor 302 or on a network of which the actor processor 302 is a part.

When the system action is a change in the actor hardware state, non-limiting examples of the change include switching out the memory of the actor processor 302, performing an adaptive bandwidth allocation change on either the actor processor 302 or on a network of which the actor processor 302 is a part, performing a hardware-level data source switching change in order to change the data source to the actor processor 302, performing an adaptive processing change at the actor processor 302, performing an adaptive processing shift between actor processors 302 in order to alter the processing load on a particular actor processor 302, cycling a power supply to the actor processor, imposing a hardware interrupt and interrupt routine on the actor processor 302, and changing the connections between the actor processor 302 and external networks and devices.

When the system action is a change in the actor processor 302 input, non-limiting examples of the change include performing a switching operation to restrict access of the actor processor 302 to a data source and performing a switching operation to change the data sources accessed by the actor processor 302.

When the system action is a system-external change, non-limiting examples of the change include triggering a video monitoring system (such as a closed-circuit video monitoring system monitoring an area about the actor processor 302), locking a physical barrier, and deploying a hazard reduction system (such as a chemical dilution system or a fire suppression system).

As an illustrative example, the control module 502 can trigger an interrupt routine on the actor processor 302. Upon detection of an undesired or anomalous state in the actor processor 302, the observer processor 306 causes the control module 502 to start an interrupt routine on the actor processor 302. The interrupt routine may be communicated via a specially designed port in the actor processor 302. One activity of the interrupt routine may be to check the status of each process running on the actor processor 302. Upon detecting a process in a "not responding" state, the interrupt routine can kill the errant process, and restart the process anew to return the system to its normal run state.

Figure 6:
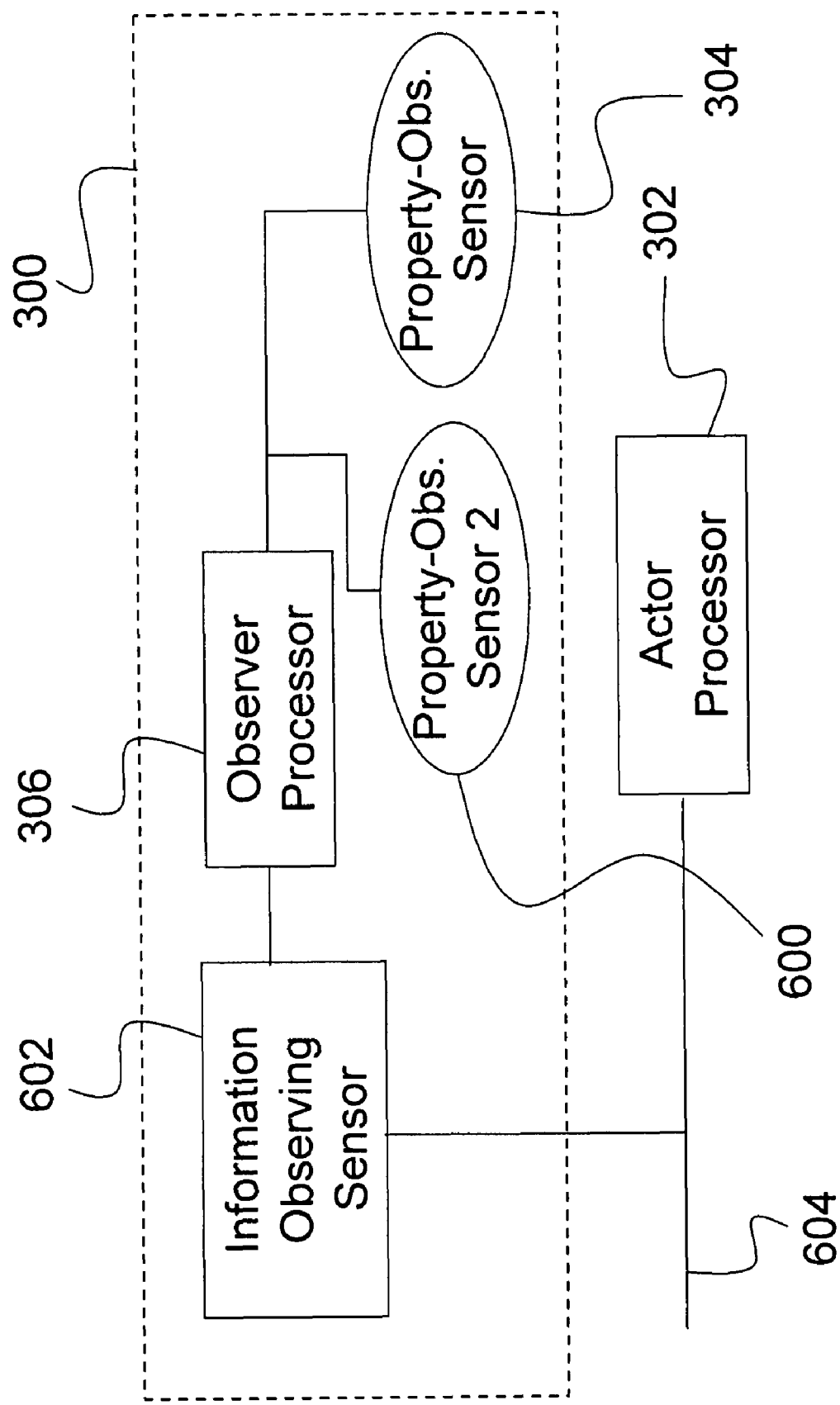
FIG. 6 is a block diagram of an observer module according to the present invention, where the observer module includes multiple property-observing sensors and an information observing sensor.

In another aspect, as shown in FIG. 6, an observer module 300 may further comprise a secondary property-observing sensor 600 connected with the observer processor 306 to provide a signal to the observer processor 306 for use as an observation signal. Non-limiting examples of secondary property-observing sensors 600 include devices such as temperature sensors, magnetic field sensors, electricity meters, humidity sensors, motion sensors, pressure sensors, and air quality sensors. The secondary-property observing sensor 600 is generally used to gather further information regarding environmental conditions that may affect the actor processor 302. In operation, the secondary property-observing sensor 600 may be used to provide further information to the observer processor 306 that may be correlated with the information from the property-observing sensor 304 to assist in diagnosing issues affecting the actor processor 302.

With respect to both the property-observing sensor 304 and the secondary property-observing sensor 600, it is important to note that although the figures show only one of each type being used in a given example, any number of sensors may be used with the present invention (this statement applies to all classes of sensors discussed herein). Further, other configurations of observer processors 306 with respect to the sensors will be apparent to those of skill in the art. For example, in a situation with one property-observing sensor 304 and one secondary property-observing sensor 600, the each of the sensors may have additional and separate property-observing sensors. Furthermore, it is also important to note that all connections discussed may be made by any manner known in the art, both "wired" and "wireless." Also note that the various sensors and observer processors 306 may be integrated as a single device or may be in the form of separate modules.

In another aspect, as also shown in FIG. 6, the observer module 300 may further comprise an information-observing sensor 602 configured for receiving/sampling actor information from an actor information input connection 604 and passing the information to the observer processor.

In cases where secondary property-observing sensors 600 and/or information-observing sensors 602 are incorporated in addition to property-observing sensors 304, the classifier(s) used in the observer processor(s) 306 may be trained to classify combinations of the outputs of the various sensors and to generate an observer output signal based on a classification of an effective fusion of the various outputs from the sensors.

In another aspect, the various signals from the sensors are in the form of digital signals. The observer processor 306 may also include a variety of digital data analysis tools. Non-limiting analyses that may be used include spectral analysis, filtration of frequency components, wavelet analysis, time-frequency analysis, and extraction of at least one pattern of frequency component combinations. All of these analysis techniques employ algorithms that are generally well-known in the art, and can be readily adapted for use in the context of the present invention. By using these techniques, undesirable actor processor 302 behaviors may be detected. The classifier in the observer processor 306 may, for example, be trained to match patterns of frequency component combinations generated by the actor processor 302 with predetermined patterns of frequency component combinations to detect problems with the operation of the actor processor 302.

In order to assist in training a classifier for use in an observer processor 306 or for diagnostic testing of a system incorporating actor processors 302 and observer modules 300, an actor processor 302 may be configured with an operating system routine that evokes a known pattern in the physical property. An observer processor 306 may be configured to detect the pattern in the physical property and properly determine the routine operating on the actor processor 302. Thus, an actor processor 302 may be configured to assist in training an observer processor 306. Furthermore, it is possible for an actor processor 302 to be designed in a specific manner so as to exhibit particular physical property patterns with the operation of specific routines. Thus, software may also be specifically developed to cause the exhibition of specific physical properties when certain routine-types are run. Through proper design, it is possible to gain very specific real-time knowledge of which routines are running without adding to the input/output load of the actor processor 302.

A variety of aspects of observer modules 300 according to the present invention have been described. Observer modules 300 may be designed as networks of observer processors 306. Various aspects of observer processor 306 networks will be discussed next.

(b) Network Aspects

In an observer module 300, a set of observer processors 306 may be networked together, forming a network of observer processors 306 which share information regarding actor processors 302. Furthermore, sets of actor processors 302 may also be networked so that an observer processor network and an actor processor network reside in parallel, yet the observer processor network is designed to monitor the actor processor network while the actor network is unable to directly affect any of the observer processors 306 in the observer processor network in an explicit manner (via the instruction set of any of the actor processors 302 in the actor processor network). Before presenting more detail regarding network aspects of the present invention, it is worth noting that the designation of the contents of an observer module 300 is for convenience of definition only and as a simple verbal "container" for core components used in the invention. However, it is immaterial whether an entire network of observer processors 306 and sensors is included in one observer module 300 or whether the network is comprised of a plurality of observer modules 300 each encapsulating one observer processor 306. Additionally, multiple distinct networks (whether actor processor networks or observer processor networks) may be operated in parallel. For example, there may be multiple levels of recursive observer processor networks that monitor other observer processors 306, treating the other observer processors 306 as actor processors 302. More detail regarding the network aspects of the present invention is presented next.

Figure 7:
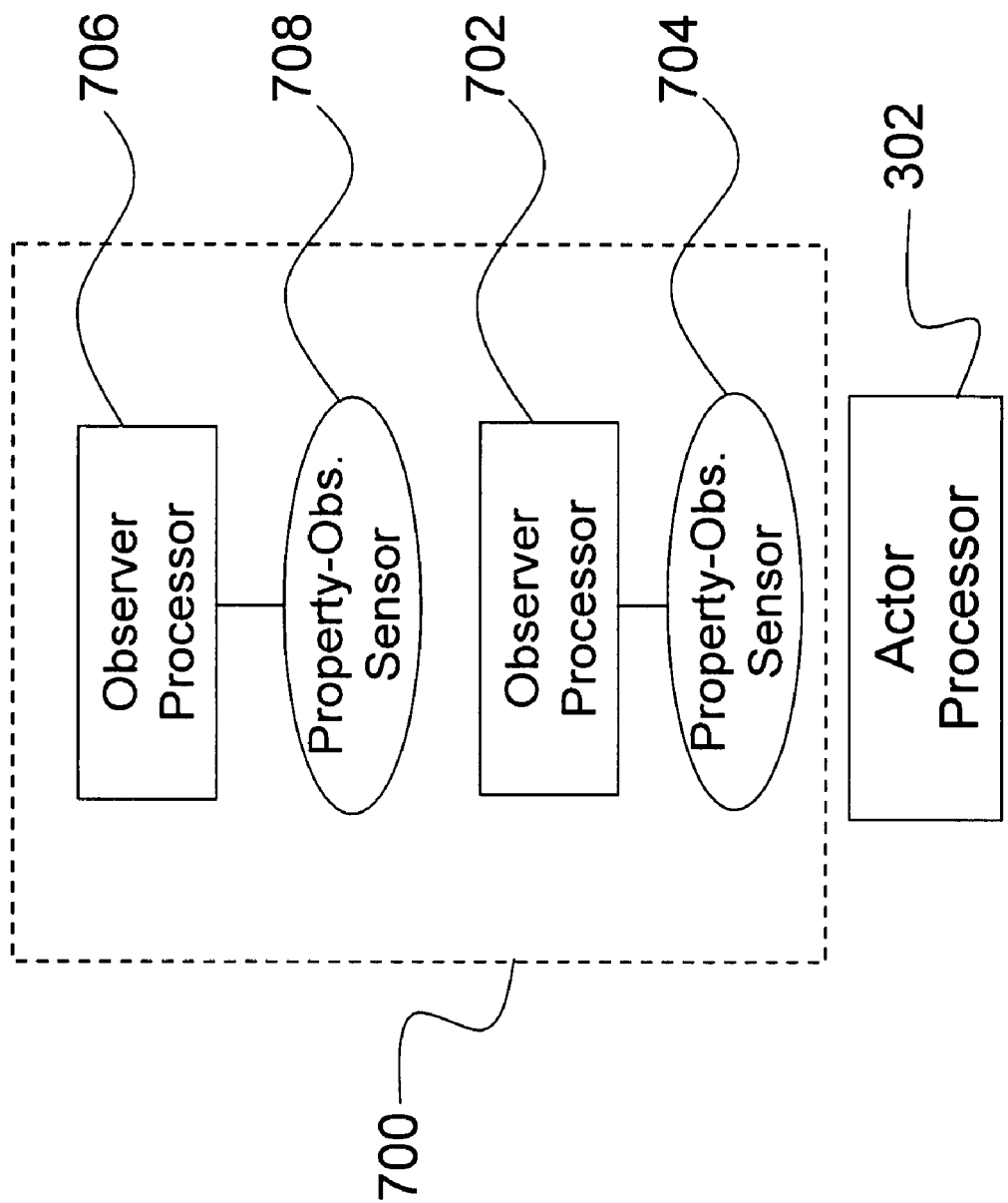
FIG. 7 is a block diagram of a redundant observer module according to the present invention.

An example of a multi-level/recursive observer module 700 is shown in FIG. 7. The observer module 700 in this case comprises a first observer processor 702 with a first property-observing sensor 704 and a second observer processor 706 with a second property-observing sensor 708. Although two observer processor/sensor pairs are shown, it is to be understood that the system is scalable in that any number of these pairs may be used and that although the observer processors are shown as paired with a single sensor, any number of sensors could be used with each observer processor. In the case shown, the first observer processor 702 receives a signal from the first property-observing sensor 704 in order to monitor an actor processor 302. The second observer processor 706 receives a signal from the second property-observing sensor 708 in order to monitor the first observer processor 702, thus treating the first observer processor 702 as if it were an actor processor. It should be appreciated that when multiple observer processor/sensor pairs are used, at least one of the observer processors must monitor more than one other processor. Strictly speaking, depending on the particular arrangement of observer processors and sensors, the system may or may not be a recursive system.

Figure 8:
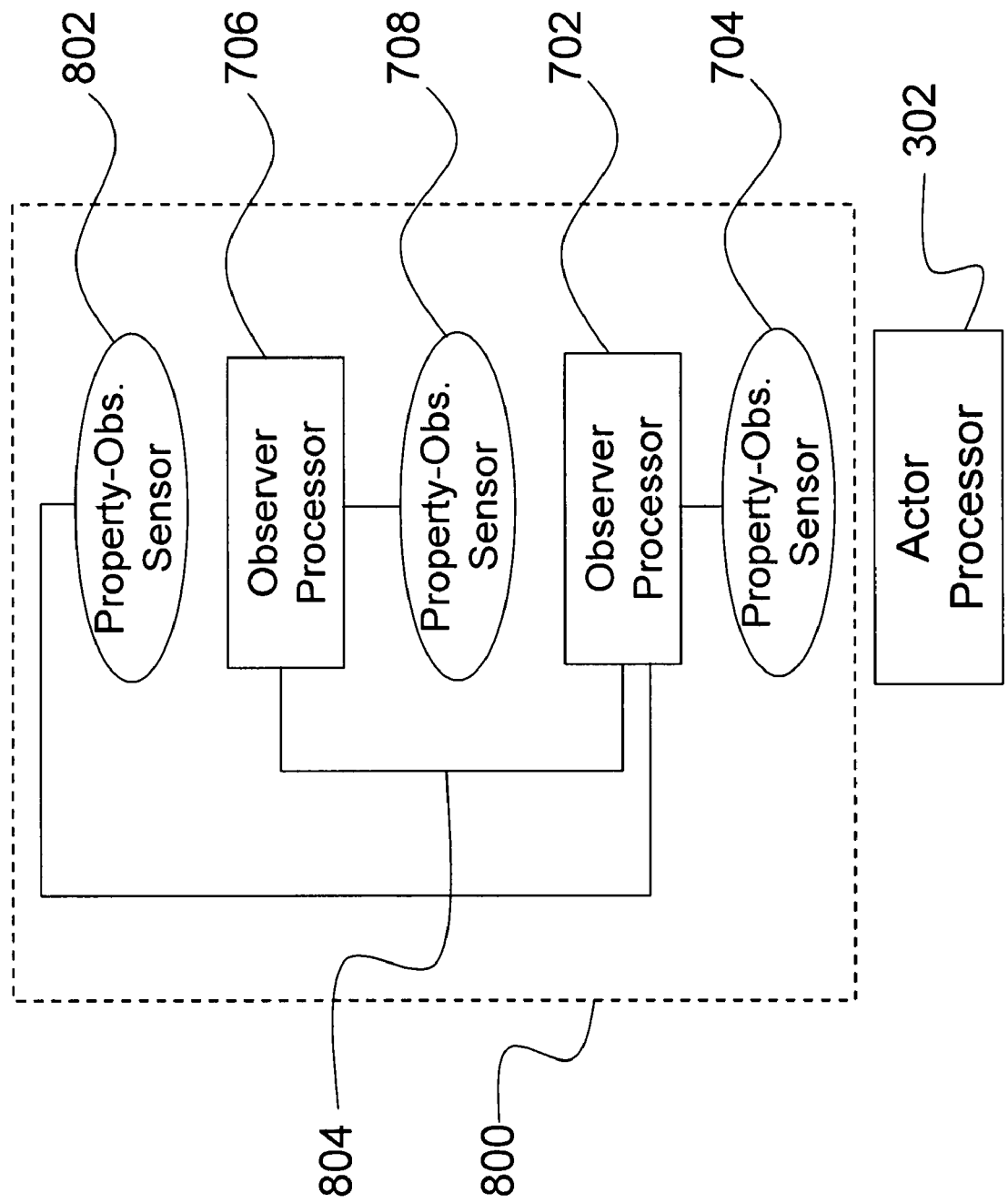
FIG. 8 is a block diagram of a completely coupled observer module according to the present invention, where the observer processors are communicatively coupled in an observer network.

Another multi-level/recursive observer module 800 is presented in FIG. 8. The arrangement of the observer processors is the same as was shown in FIG. 7, with two differences. First, the first observer processor 702 is equipped with a third property-observing sensor 802 which is configured to permit the first observer processor 702 to monitor the second observer processor 706. Thus, in this example, each observer processor is monitored by another observer processor, creating a completely observer-coupled recursive system. As with the aspect shown in FIG. 7, this system is scalable. The second difference from the aspect presented in FIG. 7 is that the observer processors are coupled using a network link 804. Thus, the observer processors may communicate information on a network that is separate from an actor processor 302 or an actor processor network.

The operations performed by the present invention may be encoded as a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. An illustrative diagram of a computer program product embodying the present invention was depicted in FIG. 2. The computer program product is depicted as a magnetic disk 200 or an optical disk 202 such as a CD or DVD. However, as mentioned previously, the computer program product generally represents computer readable code stored on any desirable computer readable medium.

What is claimed is:

1. A system for independently observing and modifying activity in an actor processor, where the actor processor includes a memory, an input for receiving actor input information, an actor software state, and an actor hardware state, and where the actor processor produces a detectable aggregate physical property having a pattern, the system comprising an observer module including:

a property-observing sensor for detecting and sampling the aggregate physical property of the actor processor and for generating an observation signal based on the physical property;

an observer processor coupled with the property-observing sensor for receiving the observation signal, the observer processor operative to analyze the pattern of the aggregate physical property as provided via the observation signal, and to generate an observer output signal based on the analysis.

2. A system as set forth in claim 1, wherein the actor processor has an actor instruction set and the observer processor has an observer instruction set, and that a mapping from the actor instruction set to the aggregate physical property is such that the mapping eliminates the ability of the actor instruction set to affect the observer instruction set.

3. A system as set forth in claim 1, where the actor processor has a clock with a clock frequency and the aggregate physical property is sampled by the property-observing sensor at a sampling rate by the property-observing sensor, and where the sampling rate is not synchronized with the clock frequency of the clock of the actor processor.

4. A system as set forth in claim 3, where the observer processor has a clock, and where the clock of the observer processor and the clock of the actor processor are independent and decoupled such that they operate asynchronously.

5. A system as set forth in claim 1, wherein the aggregate physical property observed by the property-observing sensor is outside of the explicit control of an instruction set of the actor processor.

6. A system as set forth in claim 1, wherein the property-observing sensor provides isolation between the actor processor and the observer processor such that integrity of an instruction set of the observer processor is shielded from explicit alteration by the actor processor.

7. A system as set forth in claim 1, comprising a plurality of consecutive observer modules in a recursive relationship, where each consecutive observer module is configured to observe a previous observer module, treating the previous observer processor as an actor processor.

8. A system as set forth in claim 1, wherein an observer module comprises a plurality of property-observing sensors, wherein an observer processor is configured to be coupled with a plurality of property-observing sensors, and wherein each observer processor is observed by at least one other observer processor, thereby creating a completely observer-coupled recursive system.

9. A system as set forth in claim 1, the observer module further including a communication link connected with a control module, and operative to transmit a signal from the observer processor to the control module to trigger a system action upon the detection of a predetermined observation signal.

10. A system as set forth in claim 9, wherein the communication link is a unidirectional communication link.

11. A system as set forth in claim 9, wherein the system action is selected from a group consisting of:

an alarm;

accessing a logical port of the actor processor;

a change in the actor software state;

a change in the actor hardware state;

a change in the actor processor input;

a deployment of a counter measure;

a triggering of additional sensors based on the observation signal to more specifically monitor the actor processor, where the additional sensors are connected with an observer processor for providing supplementary information to the observer processor, to be used in combination with the observation signal for generating an enhanced observation signal;

pausing the actor processor and granting diagnostic and corrective access to the information content of the actor processor; and triggering a system-external action.

12. A system as set forth in claim 11, wherein the change in the actor software state is selected from a group consisting of a software-level reset, initiation of a software interrupt routine, and an adaptive processing change.

13. A system as set forth in claim 11, wherein the change in the actor hardware state is selected from a group consisting of switching out the memory of the actor processor, a hardware data source switching change, an adaptive processing change at the actor, an adaptive processing shift between actors, cycling a power supply to the actor processor, an imposition of a hardware interrupt and imposition of an interrupt routine on the actor processor, and a change in connections between the actor processor and external networks and devices.

14. A system as set forth in claim 11, wherein the change in the actor processor input is selected from a group consisting of a switching operation to restrict access to a data source and a switching operation to change data sources.

15. A system as set forth in claim 11, wherein the system-external action is selected from a group consisting of triggering a closed-circuit video monitoring system observing an area, a locking of a physical barrier, and a deployment of a hazard reduction system.

16. A system as set forth in claim 1, wherein the property-observing sensor is selected from a group consisting of an electromagnetic pickup device for receiving electromagnetic signals from the processor, an electromagnetic imaging device, a voltage-sensing tap coupled with actor processor circuitry, a current-sensing tap coupled with actor processor circuitry, a mechanical vibration sensor, and an array of thermal sensors.

17. A system as set forth in claim 16, wherein the electromagnetic pickup device comprises an antenna for receiving electromagnetic signals from the processor and an analog-to-digital (AD) converter for converting the electromagnetic signals to digital signals for use by the observer processor.

18. A system as set forth in claim 17, wherein the electromagnetic pickup device further comprises a frequency downconverter to down-convert a high frequency electromagnetic signal from the actor processor into a lower frequency signal prior to sampling.

19. A system as set forth in claim 18, wherein the downconverter is an AM/FM tuner tuned near a harmonic of a clock frequency of the actor processor.

20. A system as set forth in claim 1, further comprising a secondary property-observing sensor connected to provide a signal to the observer processor for use as an observation signal, the secondary property-observing sensor selected from a group consisting of temperature sensors, magnetic field sensors, electricity meters, humidity sensors, motion sensors, pressure sensors, and air quality sensors.

21. A system as set forth in claim 1, wherein the observer processor includes a classifier trained to classify observation signals and to generate an observer output signal based on the classification.

22. A system as set forth in claim 1, further comprising an information-observing sensor configured for receiving the actor information and for passing the information to the observer processor.

23. A system as set forth in claim 22, wherein a classifier in the observer processor is trained to classify combinations of the observer signals and actor information and to generate an observer output signal based on the classification.

24. A system as set forth in claim 1, further comprising a plurality of observer processors, wherein at least a portion of the plurality of observer processors are directly interconnected to exchange information, thus providing a network of observer processors.

25. A system as set forth in claim 1, wherein the observation signal is a digital signal, and wherein the observer processor analyzes the observation signal by a technique selected from a group consisting of: spectral analysis, filtration of frequency components, wavelet analysis, time-frequency analysis, and extraction of at least one pattern of frequency component combinations.

26. A system as set forth in claim 25, wherein at least one pattern of frequency component combinations is a predetermined pattern of frequency component combinations indicating undesirable actor processor behavior.

27. A system as set forth in claim 1, wherein the observer processor and the property-observing sensor are integrated as a single component.

28. A system as set forth in claim 1, wherein the actor processor is configured with an operating system routine that evokes a known pattern in the aggregate physical property, the observer processor configured such that the observer processor may detect the pattern whenever the operating system routine is run on the actor processor.

29. A system as set forth in claim 1, comprising a plurality of interconnected observer modules, wherein an observer module comprises a plurality of property-observing sensors, wherein an observer processor is configured to be coupled with a plurality of property-observing sensors, and wherein each observer processor is observed by at least one other observer processor, thereby creating a completely observer-coupled system.

30. A system as set forth in claim 29, further comprising an information-observing sensor configured for receiving the actor information and for passing the information to the observer processor for use in conjunction with the observation signal for generating the observer output signal.

31. A system as set forth in claim 30, wherein at least a portion of the observer processors are directly interconnected to exchange information, thus providing a network of observer processors.

32. A system for independently observing and modifying activity in an actor processor, where the actor processor includes a memory, an input for receiving actor input information, an actor software state, and an actor hardware state, and where the actor processor produces a detectable aggregate physical property having a pattern, the system comprising an observer module including:

a property-observing sensor for detecting and sampling the aggregate physical property of the actor processor and for generating an observation signal based on the physical property;

an observer processor coupled with the property-observing sensor for receiving the observation signal, the observer processor operative to analyze the pattern of the aggregate physical property as provided via the observation signal, and to generate an observer output signal based on the analysis;

wherein the actor processor has an actor instruction set and the observer processor has an observer instruction set, and wherein the actor instruction set is mapped to the aggregate physical property such that the mapping eliminates the ability of the actor instruction set to affect the observer instruction set;

where the actor processor has a clock with a clock frequency and the aggregate physical property is sampled by the property-observing sensor at a sampling rate by the property-observing sensor, and where the sampling rate is not synchronized with the clock frequency of the clock of the actor processor;

where the observer processor has a clock, and where the clock of the observer processor and the clock of the actor processor are independent and decoupled such that they operate asynchronously;

wherein the physical property observed by the property-observing sensor is outside of the explicit control of the instruction set of the actor processor;

wherein the property-observing sensor obtains information about the state of the actor processor in an aggregate form;

wherein the property-observing sensor provides isolation between the actor processor and the observer processor such that integrity of the instruction set of the observer processor is shielded from explicit alteration by the actor processor;

comprising a plurality of consecutive observer modules in a recursive relationship, where each consecutive observer module is configured to observe a previous observer module, treating the previous observer processor as an actor processor;

wherein an observer module comprises a plurality of property-observing sensors, wherein an observer processor is configured to be coupled with a plurality of property-observing sensors, and wherein each observer processor is observed by at least one other observer processor, thereby creating a completely observer-coupled recursive system;

the observer module further including a communication link connected with a control module, and operative to transmit a signal from the observer processor to the control module to trigger a system action upon the detection of a predetermined observation signal;

wherein the communication link is a unidirectional communication link;

wherein the system action is selected from a group consisting of:
an alarm;
accessing a logical port of the actor processor;
a change in the actor software state;
a change in the actor hardware state;
a change in the actor processor input;
a deployment of a counter measure;
a triggering of additional sensors based on the observation signal to more specifically monitor the actor processor, where the additional sensors are connected with an observer processor for providing supplementary information to the observer processor, to be used in combination with the observation signal for generating an enhanced observation signal;
pausing the actor processor and granting diagnostic and corrective access to the information content of the actor processor; and
triggering a system-external action;

wherein the change in the actor software state is selected from a group consisting of a software-level reset, and initiation of a software interrupt routine, an adaptive processing change;

wherein the change in the actor hardware state is selected from a group consisting of switching out the memory of the actor processor, a hardware data source switching change, an adaptive processing change at the actor, an adaptive processing shift between actors, cycling a power supply to the actor processor, an imposition of a hardware interrupt and imposition of an interrupt routine on the actor processor, and a change in connections between the actor processor and external networks and devices;

wherein the change in the actor processor input is selected from a group consisting of a switching operation to restrict access to a data source and a switching operation to change data sources;

wherein the system-external action is selected from a group consisting of triggering a closed-circuit video monitoring system observing an area, a locking of a physical barrier, and a deployment of a hazard reduction system;

wherein the property-observing sensor is selected from a group consisting of an electromagnetic pickup device for receiving electromagnetic signals from the processor, an electromagnetic imaging device, a voltage-sensing tap coupled with actor processor circuitry, a current-sensing tap coupled with actor processor circuitry, a mechanical vibration sensor, and an array of thermal sensors;

wherein the electromagnetic pickup device comprises an antenna for receiving electromagnetic signals from the processor and an analog-to-digital (AD) converter for converting the electromagnetic signals to digital signals for use by the observer processor;

wherein the electromagnetic pickup device further comprises a frequency down-converter to down-convert a high frequency electromagnetic signal from the actor processor into a lower frequency signal prior to sampling;

wherein the down-converter is an AM/FM tuner tuned near a harmonic of a clock frequency of the actor processor;

further comprising a secondary property-observing sensor connected to provide a signal to the observer processor for use as an observation signal, the secondary property-observing sensor selected from a group consisting of temperature sensors, magnetic field sensors, electricity meters, humidity sensors, motion sensors, pressure sensors, and air quality sensors;

wherein the observer processor includes a classifier trained to classify observation signals and to generate an observer output signal based on the classification;

further comprising an information-observing sensor configured for receiving the actor information and for passing the information to the observer processor;

wherein the classifier is trained to classify combinations of the observer signals and actor information and to generate an observer output signal based on the classification;

wherein at least a portion of the observer processors are directly interconnected to exchange information, thus providing a network of observer processors;

wherein the observation signal is a digital signal, and wherein the observer processor analyzes the observation signal by a technique selected from a group consisting of: spectral analysis, filtration of frequency components, wavelet analysis, time-frequency analysis, and extraction of at least one pattern of frequency component combinations;

wherein at least one pattern of frequency component combinations is a predetermined pattern of frequency component combinations indicating undesirable actor processor behavior;

wherein the observer processor and the property-observing sensor, and the secondary property-observing sensor are integrated as a single component; and wherein the actor processor is configured with an operating system routine that evokes a known pattern in the aggregate physical property, the observer processor configured such that the observer processor may detect the pattern whenever the operating system routine is run on the actor processor.

33. A computer program product for observing and modifying activity in an actor processor, where the actor processor includes a memory, an input for receiving actor input information, an actor software state, and an actor hardware state, and where the actor processor produces a detectable aggregate physical property having a pattern, the computer program product comprising computer instructions stored on a non-transitory computer-readable medium that are executable by a computer for causing the computer to perform operations of:

receiving and sampling the aggregate physical property of the actor processor;

generating, at an observer processor, an observation signal based on the physical property;

analyzing the pattern of the aggregate physical property as provided via the observation signal; and generating an observer output signal based on the analysis.

34. An observer processor for independently observing and modifying activity in an actor processor, the observer processor configured to:

receive an observation signal from a property-observing sensor, the observation signal representing a patterned aggregate physical property as produced by the actor processor and detected by the property-observing sensor; and analyze the pattern of the aggregate physical property as provided via the observation signal, and to generate an observer output signal based on the analysis.

* * * * *